United States Patent
Miyahara et al.

(10) Patent No.: US 6,259,857 B1
(45) Date of Patent: Jul. 10, 2001

(54) APPARATUS AND METHOD THAT PROVIDE SMOOTH IMAGES IN SLOW PLAYBACK MODE

(75) Inventors: Hiroyuki Miyahara; Michihiro Aso, both of Kanagawa-ken (JP)

(73) Assignee: Victor Company of Japan, Limited, Yokahoma (JP)

( * ) Notice: Subject to any disclaimer, the term of this patent is extended or adjusted under 35 U.S.C. 154(b) by 0 days.

(21) Appl. No.: 09/406,267

(22) Filed: Sep. 24, 1999

(30) Foreign Application Priority Data

Sep. 28, 1998 (JP) .................................................. 10-273855

(51) Int. Cl.[7] .................................................. H04N 5/783
(52) U.S. Cl. ............................ 386/68; 386/117; 358/906; 358/909.1
(58) Field of Search ................................. 386/68, 80, 81, 386/82, 31, 38, 107, 117; 358/906, 909.1; H04N 5/783

(56) References Cited

U.S. PATENT DOCUMENTS

| | | | |
|---|---|---|---|
| 5,031,051 | * 7/1991 | Kim | 386/68 |
| 5,390,028 | * 2/1995 | Kobayashi et al. | 386/31 |
| 5,930,447 | * 7/1999 | Shitani | 386/68 |
| 6,137,948 | * 10/2000 | Moon et al. | 386/68 |

* cited by examiner

*Primary Examiner*—Huy Nguyen
(74) *Attorney, Agent, or Firm*—Nath & Associates PLLC; Gary M. Nath; Marvin C. Berkowitz

(57) ABSTRACT

Charges are read out from a CCD n (where n is an integer or greater) times within 1 field period, under the control of a controller. Under the control of a memory controller, a VTR records the n images as a video signal for 1 field, based on the readout charges. When playing back, under control of the memory controller, the video signal for 1 field, which is read out from the VTR and which includes n images, is temporarily stored in a memory. The memory controller reads out the n images from the memory in time sequence, and displays each image on a display m (where m is an integer 1 or greater) times during period of m fields, thereby performing slow playback at a playback speed of 1/(n×m). Along with a video signal for each field, the VTR records information with regard to the number n of the images and the display positions thereof.

8 Claims, 7 Drawing Sheets

APPARATUS AND METHOD THAT PROVIDE SMOOTH IMAGES IN SLOW PLAYBACK MODE

BACKGROUND ART OF THE INVENTION

1. Field of the Invention

The present invention relates to imaging apparatus and method that are capable of providing smooth imaging when playing images back in slow playback mode.

2. Description of the Related Art

In current video cameras, a solid-state imaging section (CCD image sensor) that is formed by a plurality of solid-state imaging elements, is used as an imaging means that is smaller and lighter than an imaging tube and which can be produced at a low cost. The construction of a general type of CCD image sensor is shown in FIG. 1A.

Figure 1A:
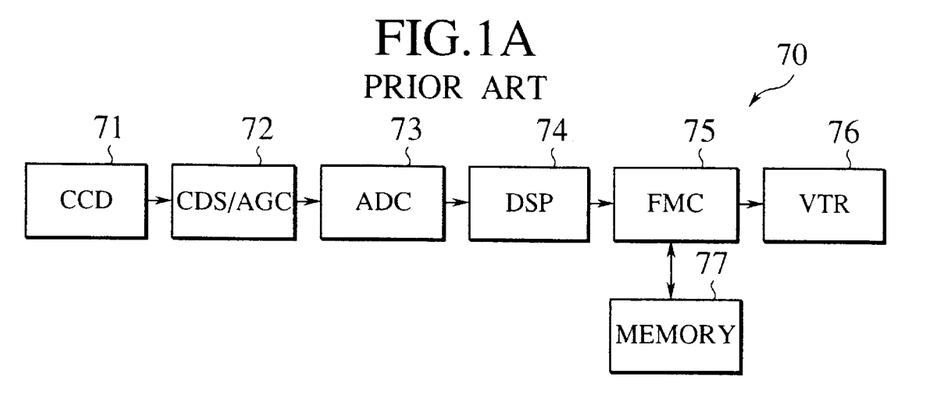
FIG. 1A through FIG. 1D are block diagrams that show the configuration and operation of a video camera of the past.

FIG. 1A shows a video camera 70 of the past, which has a CCD image sensor 71, which performs imaging of the subject that is shown in the drawing, a correlated double sampling/automatic gain controller (CDS/AGC) 72, which eliminates noise components from the signal from the CCD image sensor 71, an analog-to-digital converter (ADC) 73, which converts the video signal from the CDS/AGC 72 to a digital signal, and a digital signal processor (DSP) 74, which converts the output from the ADC 73.

The video camera 70 further has a memory 77 for temporary storage of a video signal from the DSP 74, a video tape recorder (VTR) 76, which records onto and plays back from a video tape a video signal from the DSP 74, and a memory controller (FMC) 75, which performs control of readout from the memory 77.

In the video camera 70, the video signal from the CCD image sensor 71 is read out, via the CDS/AGC 72, ADC 73, DSP 74, and FMC 75, for each first field and second field, this video signal being recorded by the VTR 76.

Figure 1B:
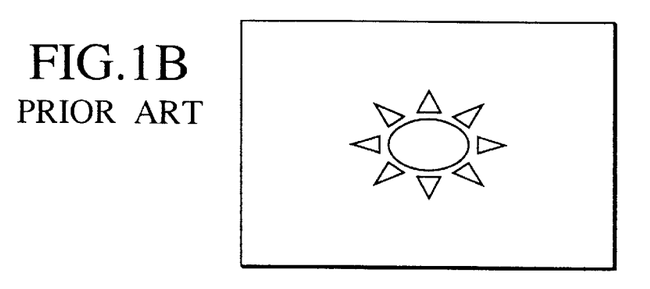

That is, in the CCD image sensor 71, electrical charges of the photoelectric conversion element are read out one at a time within one field period, and the images of the first field and the second field are synthesized therefrom, thereby forming the single frame image, as shown in FIG. 1B, this being recorded onto a video tape via the VTR 76.

Figure 1C:
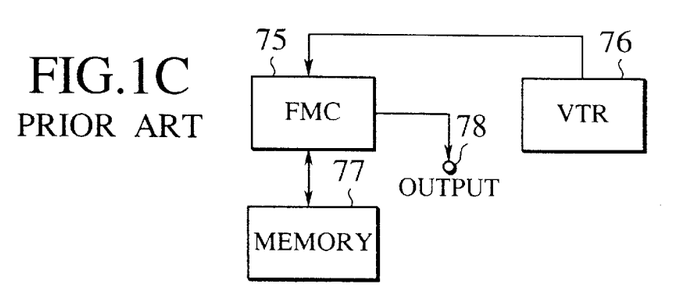
Figure 1D:
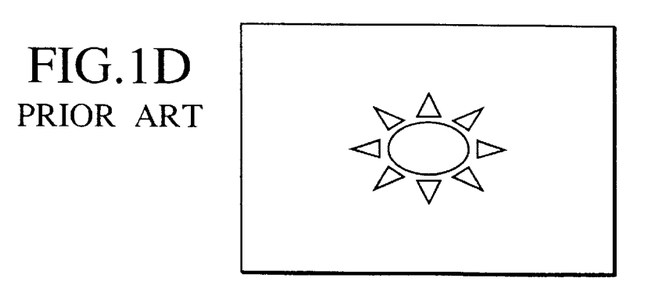

In order to play back an image that is recorded onto the video tape, in addition to supplying the output from the VTR 76 to the memory controller FMC 75, as shown in FIGS. 1C and 1D, while storing this output in the memory 77, it is output, via an output terminal 78, to an external monitoring device, such as an electronic viewfinder, a compact LCD monitor, or a TV receiver.

In the particular case of video cameras of the past, when playing the images recorded on a video tape in slow playback mode, for example, at $1/10$ the normal speed, by playing back the first field image 10 times, and then playing back the second field image 10 times, or by repeating the image of one frame 10 times, or the like, the image of one frame was repeated over a period of 10 frames.

With the above-noted video camera of the past, however, as described above, because slow playback is achieved by displaying one and the same image over a plurality of field periods, it was difficult to improve the dynamic image resolution during slow playback.

SUMMARY OF THE INVENTION

The present invention was made in consideration of the above-noted problems with the related art, and has as an object the provision of an imaging apparatus that provides smooth images when playing back in slow playback mode, and improves the image quality.

To achieve the above-noted object, there is provided an imaging apparatus that has: a solid-state imaging section having a plurality of photoelectric conversion elements that convert input light to an electrical charge; a recording section, which reads out an electrical charge from the photoelectric conversion elements n (where n is an integer 2 or greater) times within 1 field period, and which records n images as a video signal for 1 field; and a playback/display section, which reads out a video signal of 1 field, which includes n images, re-orders the n images in time sequence, and repeats m (where m is an integer 1 or greater) times the display, during a period of 1 field, of each of the n images, so as to achieve slow playback at a playback speed of $1/(n \times m)$.

In a preferred embodiment of the present invention, when the recording section records n images as the video signal for 1 field, the value of n is recorded as an identification signal along with the video signal, the playback/display section reading out not only the 1 field video signal but also this identification signal, so as to perform $1/(n \times m)$ speed slow playback.

In another preferred embodiment of the present invention, the identification signal includes information with regard to display position of each of the n images, and the playback/display section first reads out the video signal of 1 field and stores it temporarily in memory, the n images being read out in time sequence, in accordance with the display position information.

In yet another preferred embodiment of the present invention, the value of m is input by an operator.

To achieve the above-noted object, according to another aspect of the present invention, there is provide an imaging method comprising the steps of: reading out an electrical charge from a plurality of photoelectric conversion elements which convert input light to the electrical charge, n (where n is an integer 2 or greater) times within 1 field period, and recording n images as a video signal for 1 field; and reading out a video signal of 1 field, which includes n images, re-ordering the n images in time sequence, and repeating m (where m is an integer 1 or greater) times the display, during a period of 1 field, of each of the n images, so as to achieve slow playback at a playback speed of $1/(n \times m)$.

In a preferred embodiment of the present invention, at the step of recording n images as the video signal for 1 field, an identification signal that indicates the value of n is also recorded, and at the step of reading out the video signal of 1 field, not only the video signal for 1 field, but also the identification signal is read out, thereby performing slow playback at a speed of $1/(n \times m)$, based on the identification signal.

In another preferred embodiment of the present invention, the identification signal includes information with regard to the display position of each of the n images, and the video signal for 1 field is read out to be temporarily stored into a memory, and then the video signal in the memory is read out in accordance with the information with regard to the display position to re-order the n images in time sequence.

In yet another preferred embodiment of the present invention, the value of m is input by an operator.

The nature, principle and utility of the invention will become more apparent from the following detailed description when read in conjunction with the accompanying drawings.

DETAILED DESCRIPTION OF THE PREFERRED EMBODIMENTS

Preferred embodiments of an imaging apparatus according to the present invention are described in detail below, with reference to relevant accompanying draw. The imaging apparatus according to the present invention can be applied to a video camera.

[Overall Imaging Apparatus Construction]

Figure 2:
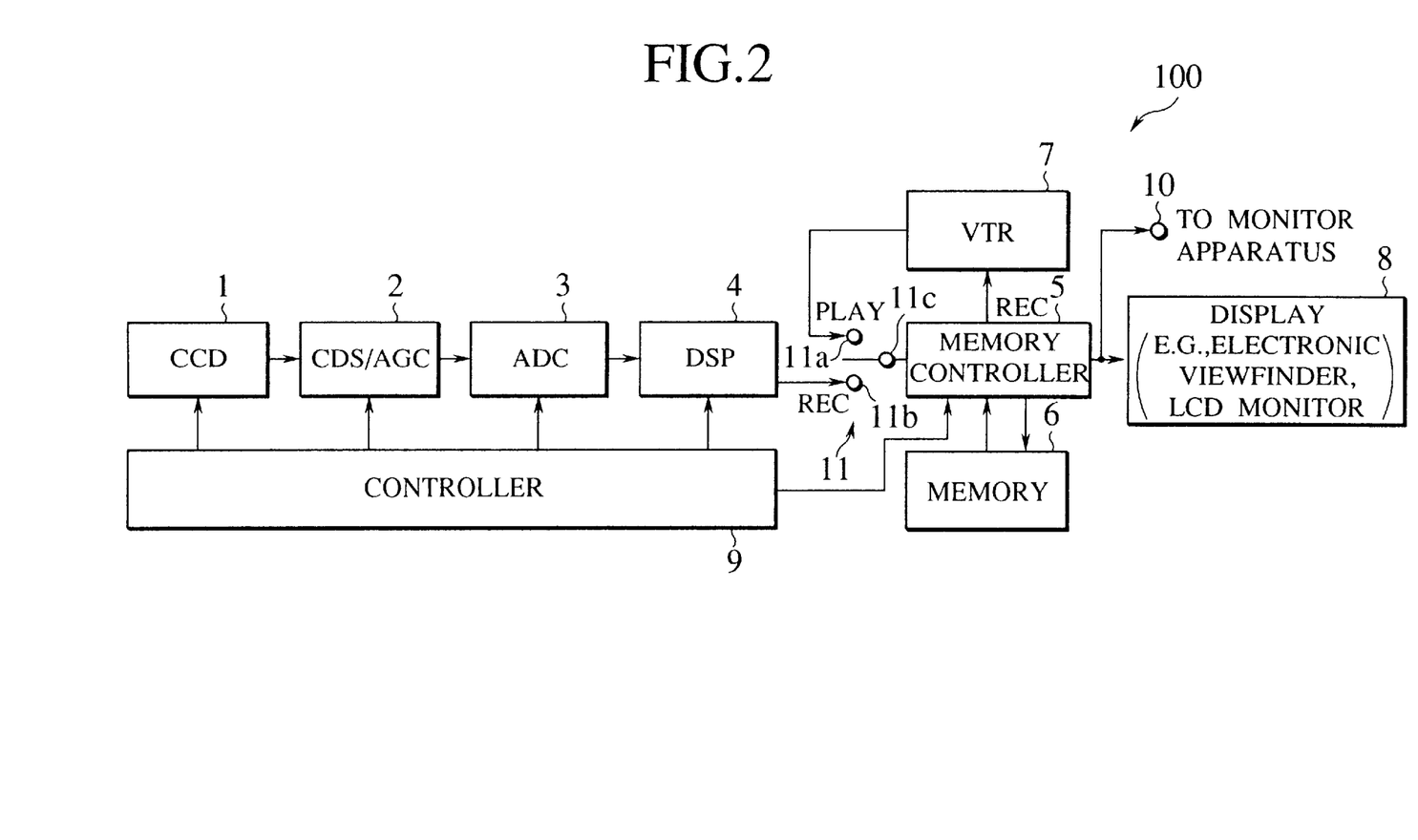
FIG. 2 is a block diagram that shows the overall configuration of an embodiment of a video camera to which an imaging apparatus according to the present invention has been applied.

A video camera 100 according to an embodiment of the present invention, as shown in FIG. 2, has a CCD image sensor 1, which perform imaging of a subject, a correlated double sampling/automatic gain control (CDS/AGC) controller 2, which eliminates noise components from the signal from the CCD image sensor 1 by performing correlated double sampling, and which also amplifies the video signal, from which noise has been removed, with an appropriate gain, and outputs the amplified video signal, an analog-to-digital converter ADC 3, which converts the output from the CDS/AGC controller 2 to a digital signal, and a digital signal processor (DSP) 4, which performs prescribed video processing on the video signal from the ADC 3.

The video camera 100 further has a memory 6, which temporarily stores the video signal from the DSP 4, a VTR 7, which records the video signal from the DSP 4 on a video tape and plays back the recorded video signal, a selector switch 11, which selects the video signal from the DSP 4 when recording and selects the video signal played back by the VTR 7 when playing back to output the selected signal, and a memory controller (FMC) 5, which performs control of storing and reading out with regard to the memory 6.

The video camera 100 furthermore has a display 8, such as an electronic viewfinder or compact LCD monitor, which displays either a picture responsive to a video signal from the DSP 4 or a picture that is played back at VTR 7, an external output terminal 10, for the purpose of supplying a video signal to an external monitor, such as a TV receiver, and a controller 9, which, depending upon the imaging mode, performs variable control of the method of reading out the electrical charges stored in the CCD image sensor 1 during recording, and control the playback condition of the VTR 7 during playback.

The CCD image sensor 1 has a solid-state imaging section that is formed by a large number of photoelectric conversion elements, which are disposed in a matrix arrangement. In this solid-state imaging section, each photoelectric conversion element stores an electrical charge in response to received light, these charges being output as electrical signals. The solid-state imaging section of the present invention performs a plurality of readouts of each photoelectric conversion element during 1 field period.

[Operation During Recording]

Figure 3A:
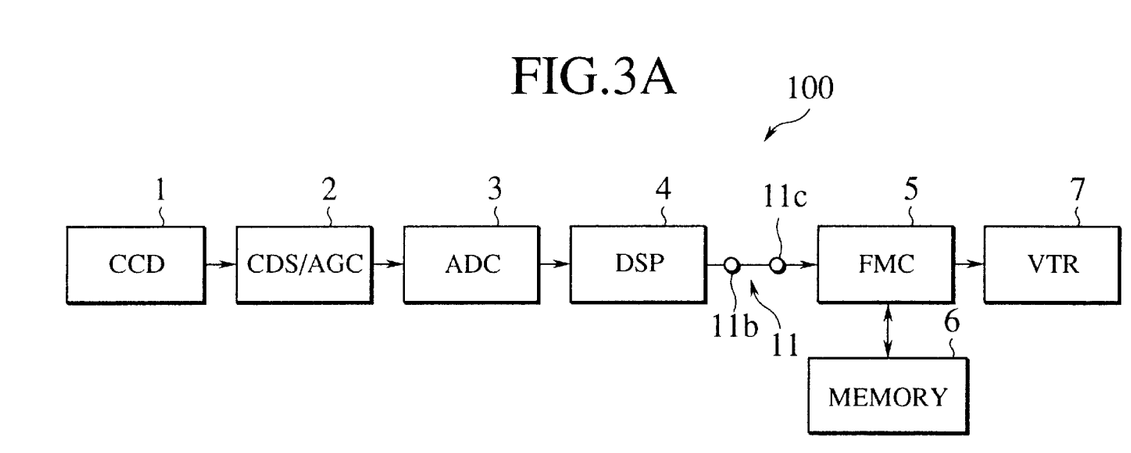
FIG. 3A is a block diagram that shows the operation of a video camera embodiment of the present invention when recording.

The operation of a video camera 100 having the above-noted configuration during recording is as follows. FIG. 3A is a block diagram that illustrates the operation of the imaging apparatus 100 shown in FIG. 2 during recording. The following description applies to image acquisition with the video camera 100 in the triple-speed mode.

First, the controller 9 supplies a readout control signal to each of the photoelectric conversion elements at an interval of $1/180$ second, so that the electrical charge of each of the photoelectric conversion elements is read out at triple the normal speed. By doing this, the electrical charges that are stored in the photoelectric conversion elements are read out at an interval of $1/180$ second.

The CDS/AGC controller 2 is supplied with a video signal from the CCD image sensor 1, whereupon it performs noise elimination processing with respect to this video signal, by means of what is known as correlated double sampling, thereby eliminating such noise as resetting noise, and also amplifies the signal with an appropriate gain before supplying it to the ADC 3. The output from the CDS/AGC 2 controller is converted to a digital signal by the ADC 3.

The digital signal processor DSP 4 performs color separation (RGB) with respect to the video signal that was obtained from a complimentary color filter array, and also performs prescribed video processing of the video signal, after which it supplies the processed signal to the selected terminal 11b of the selector switch 11. This selector switch 11 is controlled so that when imaging (that is, when recording), the selected terminal 11b is selected by the selecting terminal 11c. For this reason, the video signal from the DSP 4 is supplied via this selector switch 11 to the memory controller FMC 5 each field.

The memory controller FMC 5 performs control so as to temporarily store the video signal supplied via the selector switch 11 into the memory 6, this being read out each field and supplied to the VTR 7 at the normal recording rate. By doing this, at the VTR 7 it is possible to record onto a video tape an image of the desired subject for each field.

Figure 3B:
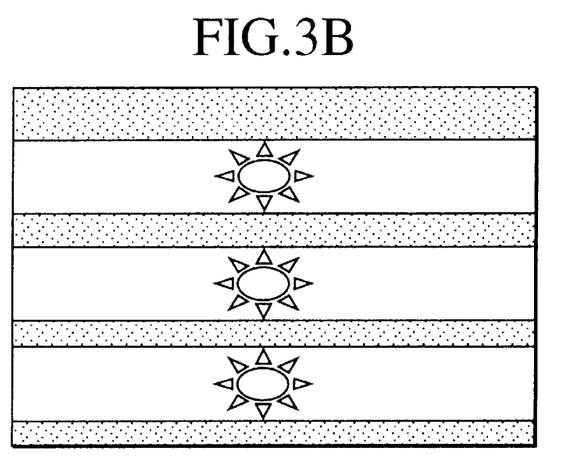
FIG. 3B is a drawing that illustrates the images that are recorded within 1 field.

At the VTR 7, a plurality of images are recorded within 1 frame. In this embodiment of the present invention, because the electrical charges from the photoelectric conversion elements are read out three times within 1 field period, at the VTR 7, three images are recorded within one field, these being stacked vertically, as shown in FIG. 3B.

When recording images at the VTR 7, an identification signal is also recorded to indicate how many images are being recorded within 1 field period. In this embodiment of the present invention, because of the existence of 3 images within 1 field period, the identification signal is recorded with n=3. Additionally, in this embodiment, the identification signal also includes information with regard to the position within the field and the sequence of recording of the n images that exist within 1 field. Thus, in this embodiment, display position information that indicates that the 3 images are recorded in time sequence from top to bottom is recorded as the identification signal.

Figure 4A:
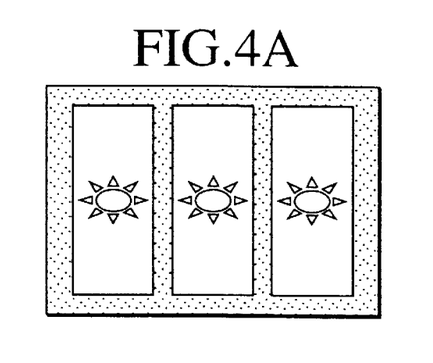
FIG. 4A through FIG. 4E are drawings that illustrate variations of the images that are recorded by a video camera according to an embodiment of the present invention.
Figure 4B:
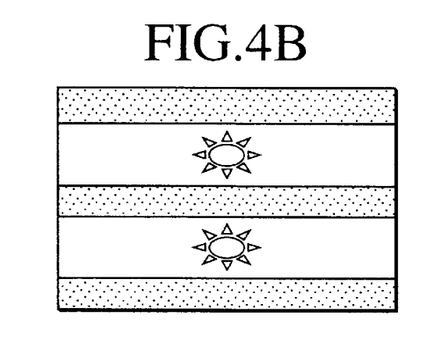
Figure 4C:
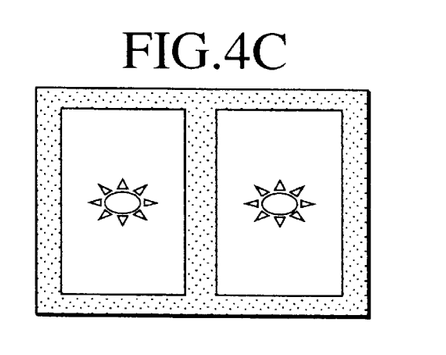
Figure 4D:
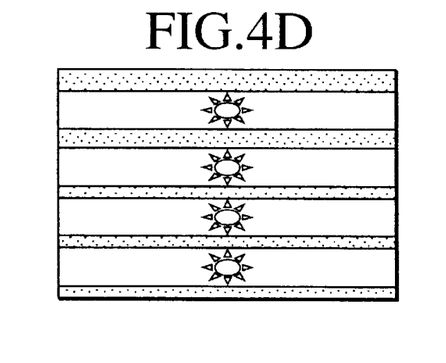

Although the above-noted embodiment is the case in which 3 images are stacked vertically within 1 field, the present invention is not restricted in this manner, and it is also possible, for example as shown in FIG. 4A, to have the 3 images lined up left-to-right. Additionally, although the above-noted embodiment is described for the case in which there are 3 images within 1 field, the present invention is not restricted to 3 images, it being possible to have 2 or 4 or some other n number of images, as necessary within 1 field. In these cases as well, as shown in FIG. 4B through FIG. 4E, it is possible to have 2, 4, . . . , to n images, either stacked top-to-bottom or lined up left-to-right.

Figure 4E:
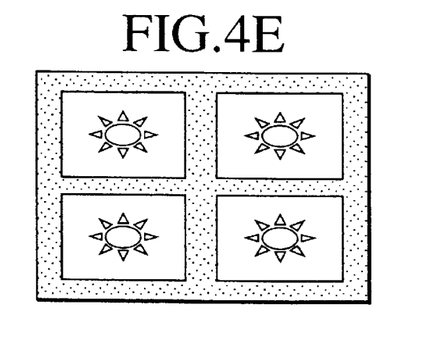

In the above-noted cases, the above-noted identification signal includes display position information, which in the example shown in FIG. 4A would indicate that there are "3 images, in time sequence in the horizontal direction." In the example shown in FIG. 4E, the identification signal would include display position information that would indicate that "4 images are arranged in time sequence, the time sequence being the first row and first column, first row and second column, second row and first column, and finally the second row and second column."

[Operation During Playback]

Figure 5A:
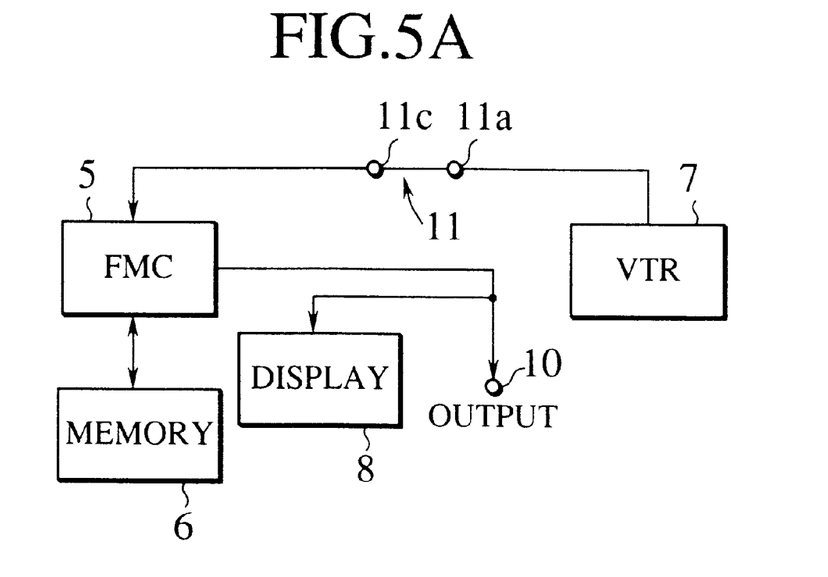
FIG. 5A is a block diagram that shows the operation of a video camera according to an embodiment of the present invention during playback.

The operation of the video camera 100 during playback is as follows. FIG. 5A is a block diagram that illustrates the operation of the imaging apparatus 100 shown in FIG. 2 during playback.

First, the controller 9 performs playback control of the VTR 9. The VTR 7 plays back the video signal from each field on the video tape, supplying the resulting playback signal to the selected terminal 11a of the selector switch 11. When this playback signal is played back in this embodiment, along with the playback of the video signal, the above-described identification signal that is used with slow playback is also playback.

The selector switch 11 is controlled so that when performing playback, the selected terminal 11a is selected. For this reason, the playback signal from the VTR 7 is supplied via the selector switch 11 and the FMC 5 to the display 8 and to the external output terminal 10 each field.

By doing this, it is possible to display the recorded images on the display 8 and, if a monitor apparatus such as a TV receiver is connected to the external output terminal 10, it is also possible to display the recorded images on the monitor apparatus.

Slow playback of images that are recorded on a video tape is performed as follows, recalling that in this embodiment of the present invention, as shown in FIG. 3B, 3 images are acquired for within each frame.

First, the playback signal is read out from the VTR 7, the readout signal being temporarily stored in sequence into the memory 6. When this playback signal is read out, the identification signal is also read out.

Figure 5B:
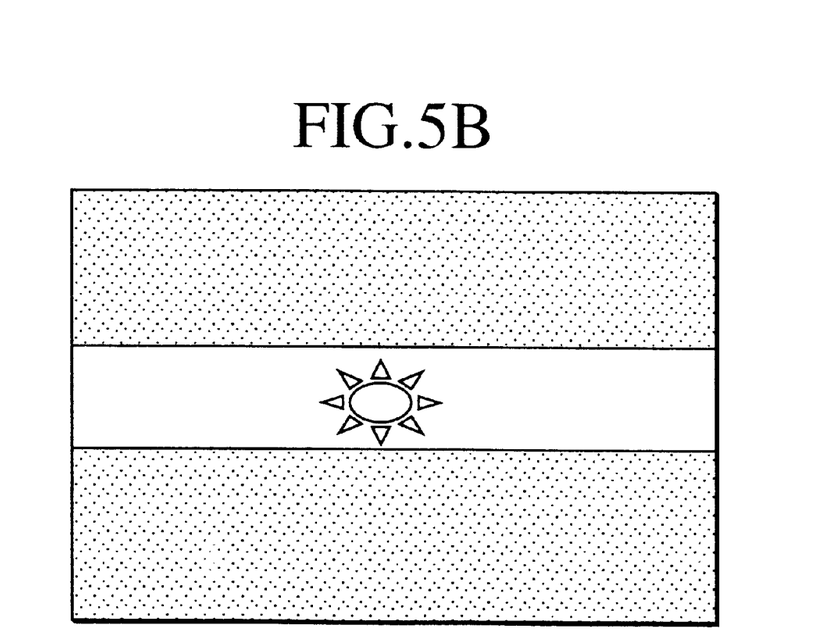
FIG. 5B is a drawing that illustrates the image that is displayed during playback.

Next, the stored playback signal is re-ordered in time sequence by the memory controller FMC 5. in accordance with the identification signal, so that 1 image is displayed in each field period, as shown in FIG. 5B. The playback speed when this is done, based on the n=3 information of the identification signal, is $1/(n \times m)$, where the value of m can be arbitrarily input by the operator.

Thus, in the above-noted embodiment, the value of n is established by the identification signal, with the value of m selected by the operator, these values together determining the speed of the slow playback. For example, if the operator selects m=1, the slow playback speed will be ⅓, and if the operator selects m=2, the slow playback speed will be ⅙. The re-ordering of the images in the memory controller FMC 5 is performed based on the display position information that is included in the identification signal. In this embodiment, because the 3 images are in time sequence from top to bottom, at the FMC 5. then images stored in the memory 6 are read out in sequence from top to bottom and displayed on the display 8.

Figure 6A:
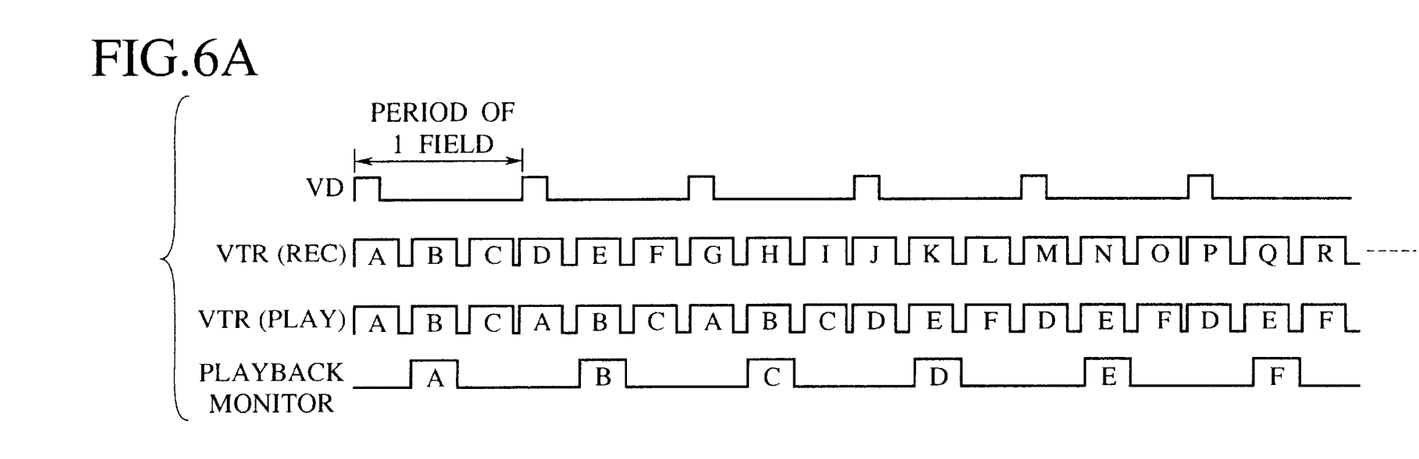
FIG. 6 is a timing diagram that shows the operation during playback of a video camera according to an embodiment of the present invention during playback.
Figure 6B:
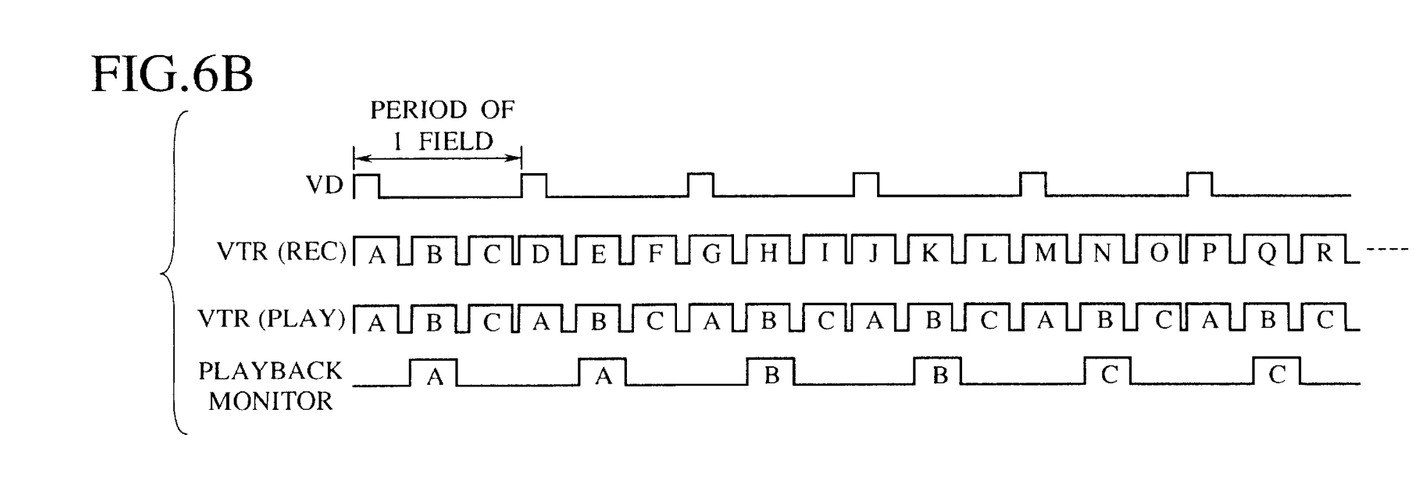

The timing of the above-described playback operation is presented as FIG. 6A and FIG. 6B. FIG. 6A shows the case of triple-speed recording, in which the operator selects m=1, resulting in slow playback at a speed of ⅓, whereas FIG. 6B shows the case in which the user selects m=2, resulting in slow playback at a speed of ⅙.

As shown in these timing diagrams by the VTR(REC), a video signal that includes 3 images is recorded during the period of the vertical sync signal VD, that is, within 1 field period. More specifically, the images A, B. and C are recorded during the first field, and the images D, E, and G are recorded during the next field.

When the above-noted video signal is played back, as shown by VTR(REC), first the images A, B. and C are read out at the normal rate. These images are stored into the memory 6, and the images are re-ordered by the memory controller FMC 5 in accordance with the identification signal, the 3 images being then repeatedly sent to a playback monitor (display 8) (n×m) times, that is, 3 times.

That is, because the value of n in this embodiment is 3 and the operator in the example given has selected m=1, slow playback is performed at a speed of 1/(3×1), the effect being that, as shown by VTR(PLAY) in FIG. 6A, the three images A, B, and C are each displayed by the display 8 three times over 3 fields.

At the playback monitor (display 8), only image A is displayed during the first field, only image B is displayed during the second field, and only image C is displayed during the third field. As a result, each image is displayed m times over m fields, so that in this case each image is displayed only one time over the period of 1 field.

In the case in which the operator selects m=2, so that playback at a speed of ⅙ is done, the 3 images A, B, and C that exist in 1 field period are read out from the VTR and are stored in the memory 6, these being re-ordered by the memory controller FMC 5, in accordance with the identification signal, so that as indicated by VTR(PLAY) in FIG. 6B, these are repeated (2×3)=6 times, and are send to the display over the period of 6 fields.

At the playback monitor, A only is displayed in the first and second fields, B only is displayed in the third and fourth fields, and C only is displayed in the fifth and sixth fields. As a result, each image is repeated m times over m fields, so that in this case each image is displayed two times over the period of 2 fields.

By performing slow playback using a video camera 100 such as described above, because a plurality of images existing within 1 field period are re-ordered in time sequence and displayed each field, there is an improvement in the dynamic image resolution, and it is possible to achieve smooth slow playback. With the video camera 100, because an identification signal that indicates how many images exist within 1 field period is recorded along with the video signal, and an appropriate playback speed is established when performing slow playback based on this identification signal, it is possible to perform slow playback at an appropriate speed without the need for an operator to make a judgment as to what recording speed was used, thereby facilitating slow playback.

Figure 7A:
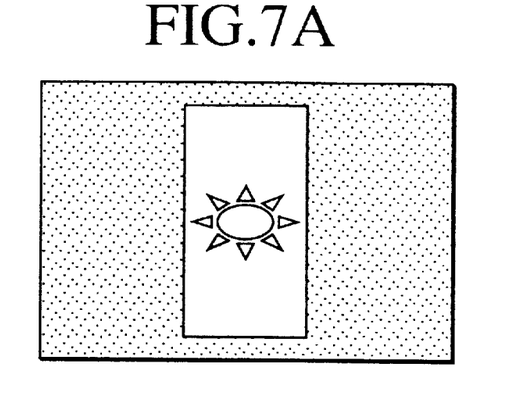
FIG. 7A and FIG. 7B are drawings that show variations of the images that are displayed by a video camera according to an embodiment of the present invention during playback.
Figure 7B:
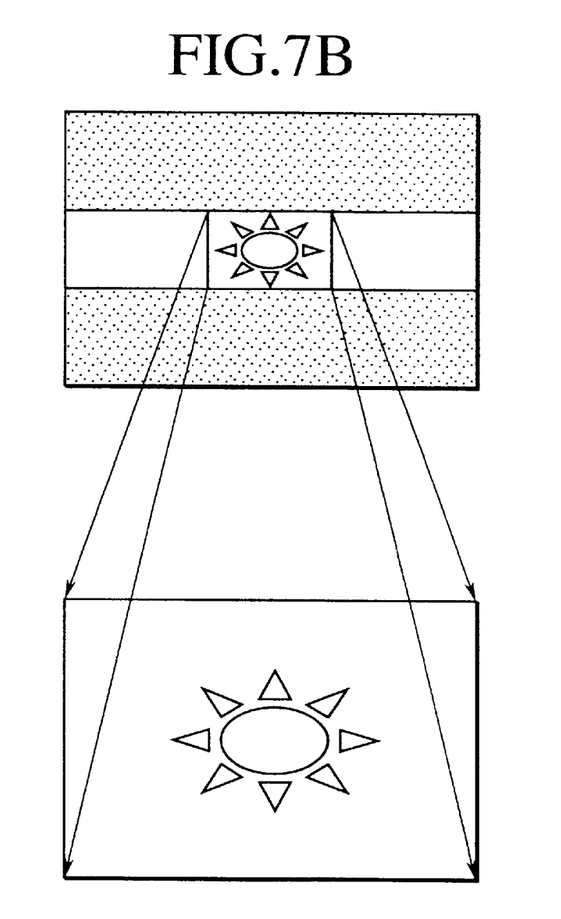

While the above description of an embodiment of the present invention was for the case in which there are 3 images in one field period, stacked from top to bottom, with one of these images selected and displayed, the present invention is not restricted in this manner. In a case for example in which, as shown in FIG. 4A, a plurality of images recorded on a video tape are arranged in a horizontal row, when displaying these images, it is possible, such as shown in FIG. 7A, to select one of the images for display. Additionally, as shown for example in FIG. 7B, it is possible display a prescribed location of the image in enlarged form, using electronic zooming or the like.

According to an imaging apparatus according to the present invention as described in detail above, by recording n images within 1 field period, and when playing back by displaying each image m times within 1 field period, it is possible to achieve slow playback at a speed of 1/(n×m), thereby achieving smooth slow playback in a video camera, and improving the image quality.

Additionally, by recording onto the video tape an identification signal with regard to how many images were recorded in each field when multiple-speed imaging is done, and controlling the storage section so as to establish the playback speed based on this identification signal when performing slow playback, it is possible to provide a further facilitation of the slow playback operation, enabling an improvement in the ease of use of the imaging apparatus.

It should be understood that many modifications and adaptations of the invention will become apparent to those skilled in the art and it is intended to encompass such obvious modifications and changes in the scope of the claims appended hereto.

What is claimed is:

1. An imaging apparatus comprising:
    a solid-state imaging section having a plurality of photo-electric conversion elements that convert input light to an electrical charge;
    a recording section, which reads out an electrical charge from the photoelectric conversion elements n (where n is an integer 2 or greater) times within 1 field period, and which records n images as a video signal for 1 field; and
    a playback/display section, which reads out a video signal of 1 field, which includes n images, re-orders the n images in time sequence, and repeats m (where m is an integer 1 or greater) times the display, during a period of 1 field, of each of the n images, so as to achieve slow playback at a playback speed of 1/(n×m).

2. An imaging apparatus according to claim 1, wherein when the recording section records n images as a video signal for 1 field, the recording section also records an identification signal that indicates the value of n, and wherein the playback/display section reads out not only the video signal for 1 field, but also the identification signal, slow playback being performed at a speed of 1/(n×m), based on the identification signal.

3. An imaging apparatus according to claim 2, wherein the identification signal includes information with regard to display position of each of the n images, and wherein the playback/display section reads out the video signal of 1 field and temporarily stores the video signal into a memory, and then reads out the video signal in the memory in accordance with the information with regard to the display position to re-order the n images in time sequence.

4. An imaging apparatus according to claim 1, wherein value of m is input by an operator.

5. An imaging method comprising the steps of:
    reading out an electrical charge from a plurality of photoelectric conversion elements which convert input light to the electrical charge, n (where n is an integer 2 or greater) times within 1 field period, and recording n images as a video signal for 1 field; and
    reading out a video signal of 1 field, which includes n images, re-ordering the n images in time sequence, and repeating m (where m is an integer 1 or greater) times the display, during a period of 1 field, of each of the n images, so as to achieve slow playback at a playback speed of 1/(n×m).

6. An imaging method according to claim 5, wherein, at the step of recording n images as the video signal for 1 field, an identification signal that indicates the value of n is also recorded, and at the step of reading out the video signal of 1 field, not only the video signal for 1 field, but also the identification signal is read out, thereby performing slow playback at a speed of 1(n×m), based on the identification signal.

7. An imaging method according to claim 6, wherein the identification signal includes information with regard to the display position of each of the n images, and the video signal for 1 field is read out to be temporarily stored into a memory, and then the video signal in the memory is read out in accordance with the information with regard to the display position to re-order the n images in time sequence.

8. An imaging method according to claim 5, wherein the value of m is input by an operator.

* * * * *